United States Patent [19]

Sanford

[11] Patent Number: 4,926,470
[45] Date of Patent: May 15, 1990

[54] TELEPHONE CALL SCREENING CIRCUIT

[76] Inventor: David M. Sanford, 7027 Twin Hill, Dallas, Tex. 75228

[21] Appl. No.: 257,739

[22] Filed: Oct. 14, 1988

[51] Int. Cl.[5] ............................................. H04M 1/66
[52] U.S. Cl. .................................... 379/199; 379/188; 379/375
[58] Field of Search ............... 379/188, 199, 200, 373, 379/374, 375

[56] References Cited

U.S. PATENT DOCUMENTS

| | | | |
|---|---|---|---|
| 3,654,396 | 4/1972 | Biezeveld | 379/199 |
| 3,902,016 | 8/1975 | Blouch | 379/102 |
| 3,936,617 | 2/1976 | Bolgiano | 379/199 |
| 4,006,316 | 2/1977 | Bolgiano | 379/104 |
| 4,074,078 | 2/1978 | Jansen | 379/199 |
| 4,369,339 | 1/1983 | Castro et al. | 379/194 |
| 4,383,138 | 5/1983 | Castro et al. | 379/361 |
| 4,387,272 | 6/1983 | Castro et al. | 379/77 |
| 4,393,278 | 7/1983 | Miyoshi | 379/199 |
| 4,446,334 | 5/1984 | Groff | 379/85 |
| 4,453,041 | 6/1984 | Castro et al. | 379/373 |
| 4,488,005 | 12/1984 | Frantz | 379/88 |
| 4,578,540 | 3/1986 | Borg et al. | 379/40 |
| 4,611,098 | 9/1986 | Giorgio et al. | |
| 4,639,552 | 1/1987 | Hall | 379/199 |
| 4,674,115 | 6/1987 | Kaleita et al. | 379/199 X |

OTHER PUBLICATIONS

*Motorola Linear/Interface Devices*, manual, pp. 3-36.

Primary Examiner—James L. Dwyer
Attorney, Agent, or Firm—Nixon & Vanderhye

[57] ABSTRACT

An inexpensive, reliable telephone answering device screens out undesirable calls, screens the calls that are dialed out and inhibits preprogrammed call prefixes from being dialed, adds the "hold" function and a simulated call transfer function to all telephones (activated by depressing a TOUCH TONE key on a standard telephone set), provides a way to use the telephones in the home as an intercom system, and provides other advanced PBX functions at low cost in a home or small business environment. A power off failsafe feature prevents power loss to the device from interrupting normal telephone operation. Several caller access codes and several dial inhibit codes can be programmed from a conventional unmodified subscriber Touch Tone telephone set, and a personal access code prevents system programming from being changed by unauthorized persons or accidentally. These and other advanced functions previously available only in a complex, expensive telephone PBX system are made available in a low cost, optimally designed device.

25 Claims, 5 Drawing Sheets

TO FIG. 1b →

TELEPHONE CALL SCREENING CIRCUIT

FIELD OF THE INVENTION

My invention relates to telephone equipment for installation in the home or office. More particularly, my invention relates to a simple and inexpensive interface between telephone company telephone lines and the user's telephone sets which performs various functions (e.g., call and dial screening, hold, intercom) formerly available only in expensive telephone equipment. Still more particularly, my invention pertains to an inexpensive telephone answering circuit that is capable of screening out undesirable incoming calls, screening outgoing calls, adding a hold function to telephone sets connected to it, and providing intercom capabilities between standard telephone sets.

BACKGROUND AND SUMMARY OF THE INVENTION

The telephone is a powerful and pervasive communications tool that unfortunately permits strangers to intrude into our home by simply dialing our telephone number. Nearly everyone has received undesirable telephone calls from telemarketers, "wrong number" type callers, obscene or harassment-type callers, and other undesirable callers (e.g., telephone "friends" who talk for such long time periods that personal visits would be more practical). We often wish there was some way to automatically screen such undesirable calls and allow us to answer the telephone only when a person we wish to talk to is on the other end of the telephone line. It sometimes seems the only practical way for most residential telephone users to evade such calls is to permit all incoming calls to ring unanswered. Most people, however, refuse to resort to this drastic measure because it forces desired incoming calls to also be ignored.

One commonly used technique to evade undesired incoming calls is to connect an automatic telephone answering machine to the telephone line. The answering machine automatically answers all incoming calls and repeats a prerecorded message and a message left by the caller over a speaker—permitting the person called to screen the call and pick up the telephone if he wishes to talk to the caller. Unfortunately, many callers simply refuse to "talk to" answering machines, and may therefore hang up without providing the person called with an opportunity to decide whether or not he wishes to answer the call.

It is generally known to automatically screen telephone calls by providing apparatus which (a) automatically "answers" an incoming call, (b) requires the caller to key in one or more TOUCH TONE digits, (c) disconnects the caller if the digits do not match predetermined digits, and (d) sound an audible alarm if the digits keyed in by the caller match the predetermined digits. See, for example, the following prior issued patents which relate to such prior art call screening systems:

U.S. Pat. No. 4,387,272 to Castro et al.
U.S. Pat. No. 3,936,617 to Bolgiano
U.S. Pat. No. 3,902,016 to Blouch
U.S. Pat. No. 4,611,098 to Giorgio et al.
U.S. Pat. No. 4,074,078 to Jansen
U.S. Pat. No. 4,446,334 to Groff
U.S. Pat. No. 4,369,339 to Castro et al.
U.S. Pat. No. 4,639,552 to Hall
U.S. Pat. No. 4,383,138 to Castro et al.
U.S. Pat. No. 4,393,278 to Miyoshi
U.S. Pat. No. 3,654,396 to Biezeveld
U.S. Pat. No. 4,453,041 to Castro et al.
U.S Pat. No. 4,488,005 to Frantz
U.S. Pat. No. 4,006,316 to Bolgiano However, further improvements are possible. For example, while such prior systems in some cases provide adequate call screening capability, they generally suffer from the disadvantages of being too complicated and expensive and provide only limited additional PBX type functions (e.g., intercom capability, hold capability, programmable call screening). In addition, inexpensive existing systems often require an external alarm type device to notify the subscriber that a properly screened call is coming in (rather than using the existing telephone ringer), and are incapable of powering telephones.

My invention, in contrast, provides an inexpensive and relatively uncomplicated telephone answering device which provides call screening and additional advanced functions not typically provided in home telephone systems. Through use of my invention, a homeowner or small businessman can obtain, at low cost, many of the features and functions of more complex and expensive telephone systems.

My invention provides, for example, a telephone answering device that is capable of not only screening out undesirable calls, but also of screening the calls that are dialed out, adding the "hold" function to all telephones (activated by depressing a TOUCH TONE key on a standard telephone set), and providing a way to use the telephones in the home as an intercom system. The present invention is fully compatible with an answering machine, which can be used to record either all incoming calls or record only screened incoming calls. No other satisfactory system of relatively nominal expense exists which can provide all of these fully programmable functions.

The following is a list of some of the significant advantageous features provided by the preferred embodiment of the present invention:

Inexpensive, compact and reliable;

Telephones are powered so that electronic telephones retain their memories and other advantages are obtained;

Fully programmable through a standard TOUCH-TONE telephone set;

A user programmable entrance code prevents unauthorized users from reprogramming the system;

Both incoming and outgoing call screening can be provided;

Multiple call screening codes can be accepted and maintained;

Different ringing cadences can be provided to distinguish between different call screening codes;

Ringer cadences can be easily changed:

Hold function is provided using standard residential type telephone equipment;

Home intercom capability uses existing standard telephone sets;

Failsafe feature automatically connects telephone sets directly to telephone company lines so a local power failure does not cause telephone service to be lost;

System uses standard Bell hook status and ringer voltages and currents (AC and DC);

Five Ringer Equivalence Numbers (R.E.N.s) are provided, thus permitting up to five telephone sets or equivalents (this is the same maximum number guaranteed by most telephone companies);

Any feature of the system can be used in combination with any other feature;

Dial screening can prevent certain preprogrammed numbers from being dialed out; and A simulated call transfer function permits the user to place an incoming call on hold and then again ring of all the extensions to request someone else to take the call.

These and other features and advantages of the present invention will be better and more completely understood by studying the following detailed description of presently preferred exemplary embodiments in conjunction with the appended sheets of drawings, of which:

DETAILED DESCRIPTION OF THE EXEMPLARY EMBODIMENT

Figure 1A:
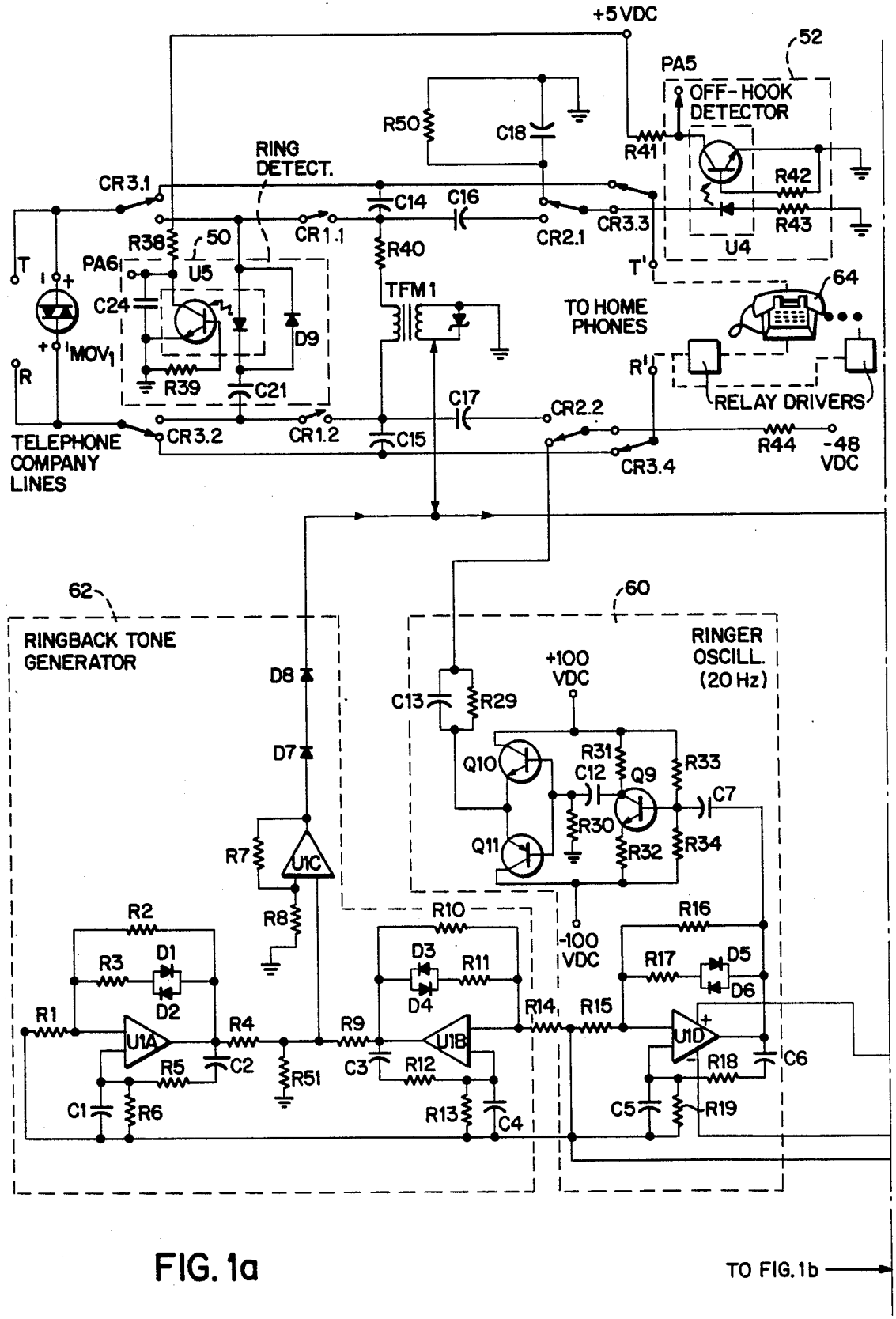
FIGS. 1A–1B are together a detailed schematic diagram of a presently preferred embodiment in accordance with the present invention.
Figure 1B:
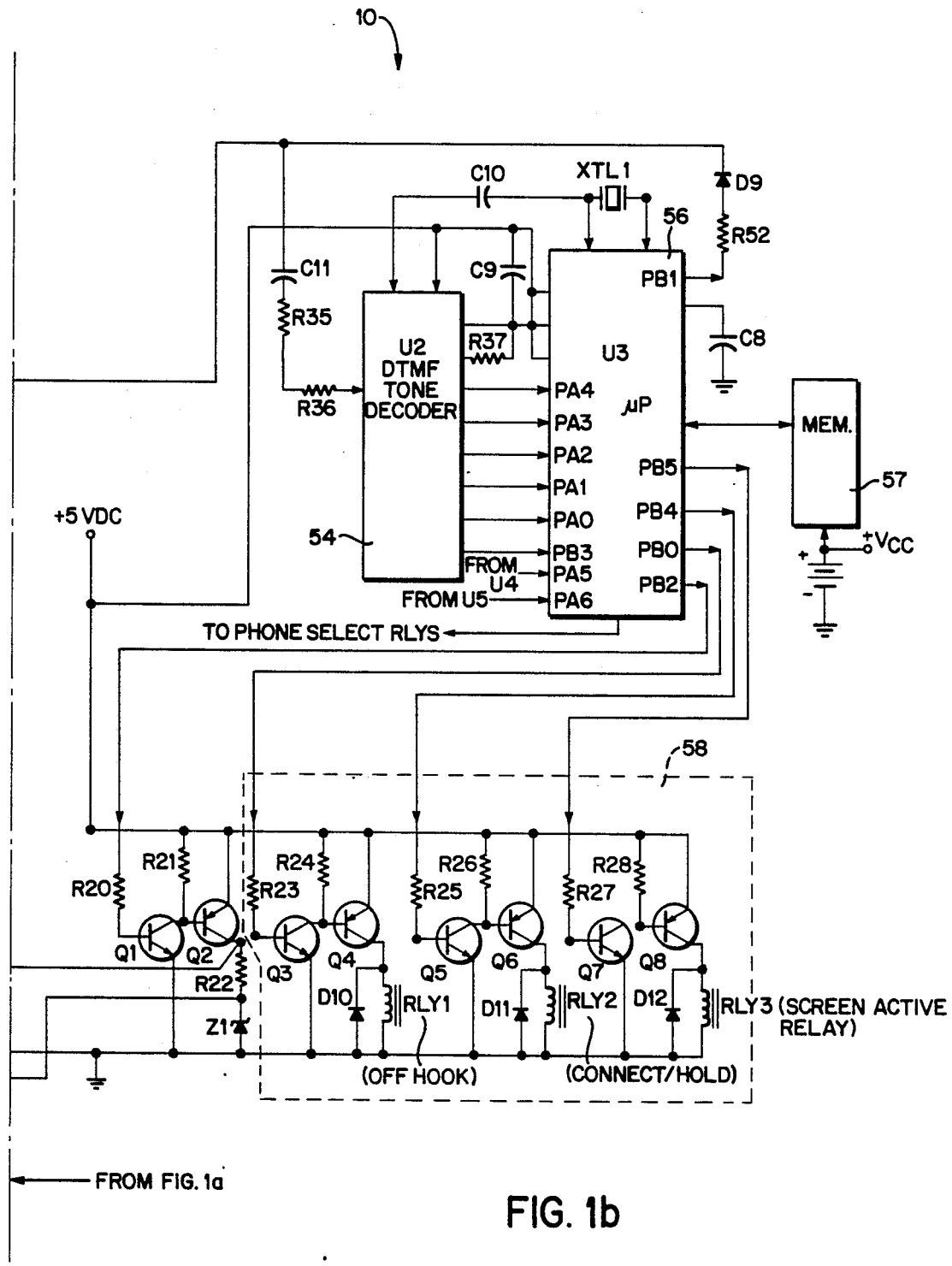

FIGS. 1A and 1B are together a detailed schematic diagram of a presently preferred exemplary embodiment of a telephone system 10 in accordance with my invention.

System 10 includes a ring detector 50, an off-hook detector 52, a DTMF tone detector/decoder 54, a microprocessor 56 and associated non-volatile memory 57, a relay driver 58, a ringer oscillator/amplifier 60, and a ringback tone generator 62. A power supply (not shown) of conventional design converts AC house current into various DC voltage levels (e.g., +5 VDC, −48 VDC, + and − 100 VDC) used to power system 10. System 10 is connected at terminals T, R to a standard TOUCH TONE telephone company line (hereafter "telephone line"), and includes at least one (and typically more) standard TOUCH TONE telephone set 64 (hereafter "phone") connected (in parallel if more than one set is used) at terminals T', R'.

Three electromagnetic or solid-state relays RLY1, RLY2 and RLY3 are used in the preferred embodiment. Relay RLY1 is an "off-hook" relay which takes the telephone line "off hook" when its normally open contacts CR1.1, CR1.2 are closed. Relay RLY2 is a "connect/hold" relay which operates DPDT contacts CR2.1, CR2.2 to connect the phone 64 to the telephone line and is also used in the "hold" function as will be explained. Relay RLY3 controls incoming call screening by controlling the position of its four-pole double throw contacts CR3.1, CR3.2, CR3.3, CR3.4, and also establishes a "normal" state of disconnecting the telephone line from the subscriber phone 64 in the preferred embodiment.

The first component the telephone line encounters in its connection to system 10 is a metal oxide varistor MOV1 connected across terminals T, R used to suppress voltage surges present on the telephone line and thus prevent such surges from damaging system 10. Ring detector 50 also connected across the telephone line detects ringing voltage present on the telephone line and produces a TTL-level signal whenever a ringing voltage is present—this TTL level signal being applied to the PA6 input of microprocessor 56 whenever an incoming ringing voltage is present.

In the preferred embodiment, ring detector 50 includes a conventional off-the-shelf optical coupler device U5 with its internal LED connected in series with DC blocking capacitor C21 across the telephone line. An external diode D9 connected in parallel with the optical coupler U5 internal LED limits the peak inverse voltage applied to the LED by an incoming ringing voltage. DC blocking capacitor C21 prevents DC current from flowing through the optical coupler 50 internal LED so that the off-hook state is not detected by the local telephone company (which typically detects an off-hook condition by measuring directly or indirectly the DC resistance across the telephone line and determining that the line is "off hook" when that DC resistance is below a certain standard resistance).

Ringing is detected when the optical coupler U5 internal LED is illuminated by the ringing voltage present on the telephone line. This illumination causes the phototransistor internal to coupler U5 to be driven into saturation, thus pulling the state of terminal PA6 down from logic level 1 to logic level through pull-up resistor R38. Resistor R39, which may not be required depending upon the type of optical coupler U5 used, connects the base of the phototransistor to ground and provides a sensitivity adjustment for ring detector 50. C24 (connected between terminal PA6 and ground) forms an RC network with resistor 38, this RC network having a time constant such that terminal PA6 remains at logic level 0 for at least a minimum time period even when short ringing pulses are sensed by ring detector 50.

The telephone line is selectively connected through relay RLY1 contacts CR1.1, CR1.2 across the primary winding of audio frequency transformer TFM1. Relay RLYI contacts CR1.1, CR1.2 provide a path for DC current, and the TFM1 transformer primary winding provides a sufficiently low resistance/impedance such that the telephone line is placed in an "off hook" state (and the telephone company switch thus detects that the line has been "answered") whenever the line is connected across the transformer winding. Resistor R40 provides current limiting through the transformer TFM1 primary winding. Transformer TFM1 provides a path for indication and ringback tones to be injected onto the telephone line and for DTMF tones carried by the telephone line and/or produced by subscriber phone 64 to be detected and decoded by system 10, as will be explained. Capacitors C16, C17 AC-couple the telephone line (via relay RLY2 contacts CR2.1, CR2.2) to the subscriber's phone 64.

As mentioned above, relay RLY3 provides a "failsafe" feature. When the coil of relay RLY3 is de-energized, normally closed relay contacts CR3.1–CR3.4 connect the telephone line directly to the subscriber's phone 64. Thus, when system 10 is powered off (e.g., if it is accidentally unplugged from the wall outlet or if a power failure occurs), relay RLY3 ensures that phone 64 is directly connected to the telephone line and thus that normal telephone service is provided. Capacitors C14, C15 couple the telephone line to ring detector 50 and the primary winding of transformer TFM1 even when contacts 3.1–3.4 are closed and relay RLY3 is deenergized to permit activation of any of the functions provided by system 10 (e.g., when system 10 is inactive).

When relay RLY3 is energized (in the preferred embodiment, at all times except when a call is actually in process or the system 10 has been powered off or deactivated), its contacts 3.1, 3.2 disconnect the telephone line from phone 64 and connect the line only to ring detector 50 and the transformer TFM1 primary winding—and contacts 3.3, 3.4 connect the subscriber's phone 64 to the off hook detector 52 and ring generator oscillator/amplifier 60. If a call comes in on the telephone line when relay RLY3 is energized, the subscriber's phone 64 does not ring in response to the ringing voltage present on the telephone line. Rather, ring detector 50 detects the presence of the ringing voltage and alerts microprocessor 56 via input PA6. The microprocessor 56 may then "answer" the call by energizing relay RLY2 (by generating an output on line PBO to activate relay driver transistors Q3, Q4) to connect the line across the primary winding of transformer TFM1. To establish a connection between the telephone line and the subscriber's phone 64, microprocessor 56 may then energize relay RLY2 (via output PB4 and driver transistors Q5, Q6) to close relay contacts 2.1, 2.2. In the preferred embodiment, the subscriber phone 64 rings in response to ringing voltage produced under the microprocessor control by ringer oscillator/amplifier 60 rather than directly in response to the telephone line ringing voltage.

Off-hook detector 52 in the preferred embodiment is connected across subscriber's phone 64 whenever relay RLY3 is energized, and detects whether the subscriber phone is on-hook or off-hook. In the preferred embodiment, off-hook detector 52 includes an optical coupler U4 the internal LED of which is connected in series with a resistor 43 to ground. A DC potential of −48 VDC is connected to subscriber phone 64 via a series resistor R44, and relay contacts 3.4 to provide power to the phone. Appropriate values of resistors 43, 44 are provided such that the current and voltage applied to the subscriber phone 64 conforms to Bell standards and such that the current flowing through the internal LED of optical coupler U4 is limited to safe levels.

When the user lifts the handset of subscriber phone 64 (or the handset of any one of several such phones if more than one phone is installed), a relatively low resistance DC path is created across terminals T', R'. This low resistance path permits current to flow through the optical coupler U4 internal diode and resistors R43, R44—causing the LED to become illuminated and driving the optical coupler phototransistor into saturation. A resistor R42 (which may be a potentiometer in the preferred embodiment) is connected between the base and the emitter of the phototransistor to provide a sensitivity control to eliminate false detection of ringer current as D.C. hook current. When the optical coupler U4 phototransistor is driven into saturation, normally high microprocessor input PA5 is pulled low through pull-up resistor R41 to provide a "low" input signal to the microprocessor.

Ringer oscillator/amplifier 60 also is connected to the subscriber's phone 64 via relay contacts CR2.2 and CR3.4. Ringer oscillator/amplifier 60 in the preferred embodiment generates a 20 Hz ringer voltage (preferably at levels closely corresponding to Bell standards) and applies this ringer voltage to the subscriber phone 64. In the preferred embodiment, ringer oscillator/amplifier 60 includes a 20 Hz oscillator circuit (built around integrated circuit 1d) and a push-pull type power amplifier stage (built around transistors Q9–Q11). The 20 Hz oscillator includes R15–R19, capacitors C5, C6 and diodes D5, D6 connected to operational amplifier 1d in a conventional wien bridge type configuration with capacitor C7 functioning as an AC coupling capacitor. Microprocessor 56 has on-off control of this oscillator stage via microprocessor output PB2 and switching transistors Q1, Q1, and performs such on/off switching at "on" durations and "off" durations specified by conventional software to provide various ringing cadences (this software can be altered as desired in the preferred embodiment to select specific cadences from a repertoire of cadences). Transistors Q1, Q2 and associated components (resistors R20–R22 and zener diode Z1) switch power on and off to op amp 1d and also provide a VCC/2 reference voltage (via the zener diode and resistor R22) needed to operate the wien bridge oscillator configuration. Formulas for calculating the values of the various components connected to op amp 1d to obtain a 20 Hz output frequency may be found in a variety of sources, including *Motorola Linear/Interface Devices* manual, page 3"36, relating to the LM 124/224/324/2902 series operational amplifiers.

The output of the wien bridge oscillator circuit is applied to the base of transistor Q9, which forms a single-stage self-biased emitter coupled amplifier with associated resistors R30–R34 and capacitors C7, C12. The output of transistor Q9 is applied to the inputs of transistors Q10, Q11, which are connected in a push-pull complementary class B power amplifier configuration with plus and minus 100 VDC connected across their respective collectors. Parallel-connected capacitor C13 and resistor R29 couple the output of ring oscillator/amplifier 60 to the subscriber's phone 64 via relays contacts CR2.2, CR3.4.

Additional operational amplifiers U1A, U1B also each connected in a wien bridge oscillator configuration form ringback tone generator 62 used to provide ringback signals to the caller in the preferred embodiment. Switched control voltage (and VCC/2 voltage) are provided to these op amps U1A, U1B via transistors Q1, Q2 and associated components under microprocessor control—so that both oscillators are activated at the same time microprocessor 56 activates ringer oscillator/amplifier 60. The frequencies of these two ringback oscillators, 440 Hz and 480 Hz in the preferred embodiment, (determined by the resistance and capacitance values connected to them) are selected to cause the two-tone output they generate to emulate the "ringback" signal generated by the public telephone switch informing a caller that the called party's telephone is ringing. These generated tone outputs are coupled to the telephone line through transformer TFM1 (the secondary of the transformer is connected directly to the output of buffer amplifier U1C through diodes D7, D8)—permitting microprocessor 56 to ring subscriber phone 64 (via ringer oscillator/amplifier 60) and simultaneously provide a ringing indication to the calling party over the telephone line.

A PB1 output of microprocessor 56 is connected via resistor R52 and diode Dg to the secondary winding of transformer TFM1. Microprocessor 56 can inject tones onto the telephone line via this PB1 output and associated signal path. The transformer TFM1 secondary winding is also connected to the input of DTMF tone detector/decoder 54, a standard off-the-shelf integrated circuit in the preferred embodiment which detects the occurrence of DTMF tone pairs produced by subscriber's phone 64 and/or carried by the telephone line and provides a digitally encoded output indicating which tone pair has been detected (0-9, * or #) to the PA0--PA4, PB3 inputs of the microprocessor 56.

Figure 2A:
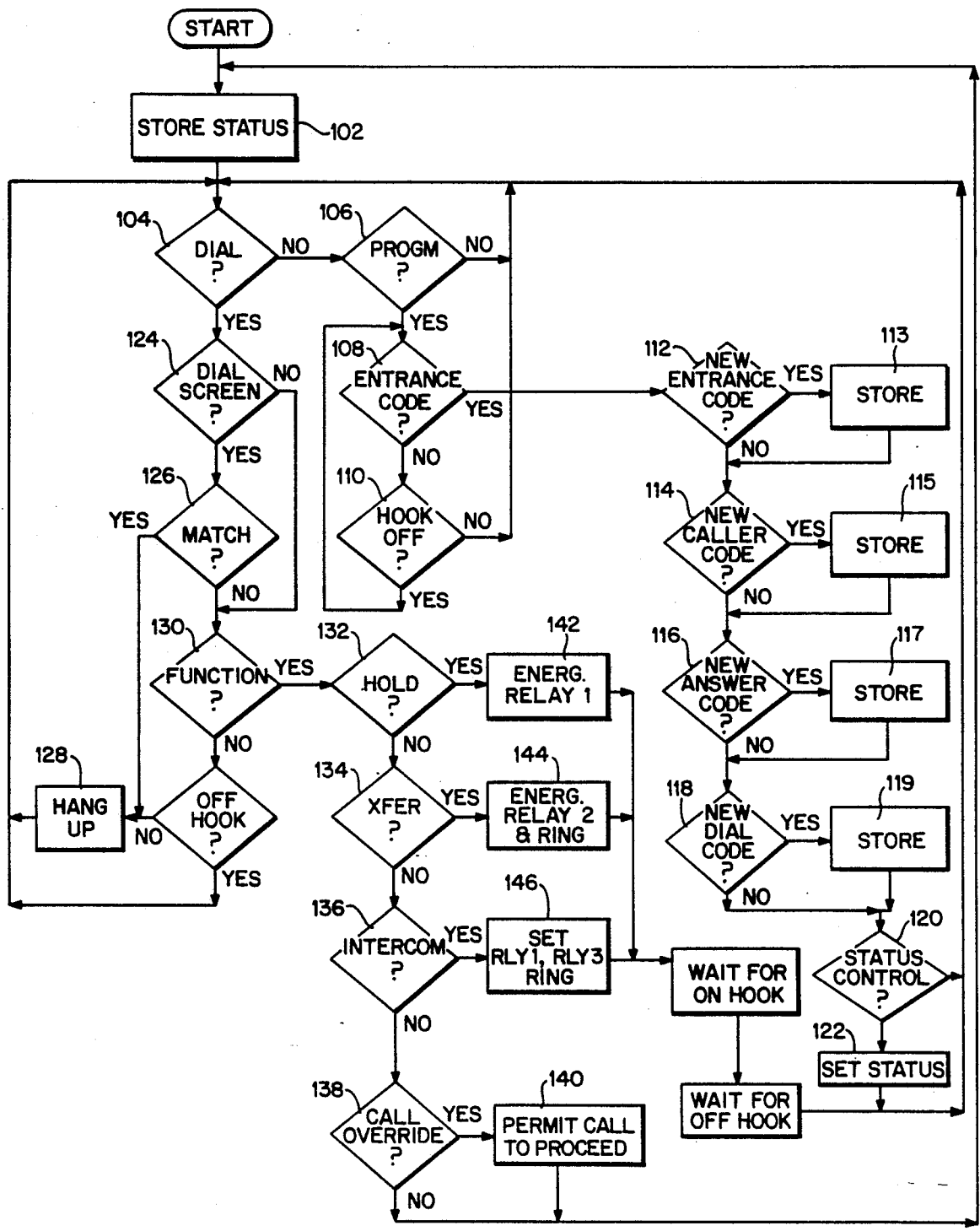
FIGS. 2A and 2B are schematic flowcharts of exemplary program control steps performed by the microprocessor shown in FIGURE 1B.

Microprocessor 56 in the preferred embodiment is a standard single chip microprocessor (type MC 6805) with internal crystal controlled oscillator, random access memory, non-volatile program/data store 57 (which may be an EEPROM internal to the microprocessor if desired), ALU, registers, and the like. Microprocessor 56 controls the functions of system 10 by executing program control instructions stored in memory. A flowchart of exemplary program control steps performed by microprocessor 56 under control of these instructions to monitor the activities of subscriber phone 64 is set forth in FIG. 2A.

Upon initial application of power to system 10, microprocessor 56 first performs a simple initialization routine (e.g., self test and the like) to ready it for receiving user instructions. In this initial state, relays RLY1, RLY2 remain de-energized and relay RLY3 is energized to disconnect the subscriber's phone 64 from the telephone. The initial status/state of system 10 is stored by block 102 into the database shown in FIG. 3. In particular, the system status flag may initially be set to "ON" (indicating system 10 is active and processing), the call screen status flag is set to "OFF" (indicating that incoming call screening is inactive), and the dial screen status flag is also set to "OFF" (indicating that outgoing calls are permitted to be dialed out without restriction as to calling prefix).

In the preferred embodiment, functions of system 10 can be activated and deactivated at will through user codes keyed in to the Touch Tone keypad of a standard residential-type Touch Tone subscriber phone 64. To activate or deactivate a function in the preferred embodiment, the user need only pick up the handset of any subscriber phone 64 and dial the following sequence:
(a) "##" followed by
(b) Personal Access Code followed by
(c) Option Select Number followed by
(d) Programming Parameter(s).

Microprocessor 56 continually monitors (via tone decoder 54 and transformer TFM1) for tone occurrences over the telephone line—and also continually monitors the "hook" status of subscriber set 64 via hook detector 52. As mentioned, in the preferred embodiment during power on conditions, relays RLY1 and RLY2 are normally de-energized and relay RLY3 is normally energized so that the subscriber phone is not connected to the telephone line but is connected to off hook detector 52. Upon detecting that the subscriber phone has gone "off hook", microprocessor 56 may energize relays RLY1 and RLY2 to connect the subscriber phone 64 to the telephone line and then waits for a detected tone. Upon detecting a tone, microprocessor 56 tests whether the tone is a "##" symbol (indicating programming) or some other symbol (indicating outgoing dialing) in the preferred embodiment (decision blocks 104, 106). In the preferred embodiment, a double "#" symbol—that is, two sequential depressions of the "#" within a certain time period—is used to initiate programming while avoiding conflicts with the standard Bell speed dialing service (which requires a user to depress the "#" key followed by a digit 0-9 indicating which speed dial number is to be accessed). If a "##" symbol is detected, (the "yes" output of decision block 106), microprocessor 56 may disconnect the subscriber phone 64 from the telephone line by de-energizing relay RLY2 (the subscriber phone remains powered through the −48 VDC voltage applied through resistor R44). If desired, relay RLY1 may remain activated during programming so that an incoming caller will receive a "busy" signal rather than a "ring no answer" during the time programming is occurring. Microprocessor 56 then waits to acquire a "personal access code" (decision block 108)—the equivalent of a password—programmed previously by the user (or by the manufacturer if system 10 is newly installed) and stored in the personal access code field shown in FIG. 3. This personal access code (three digits long in the preferred embodiment) prevents unauthorized people from changing the functions of system 10 (and also prevents accidental reprogramming). During the time system 10 awaits receipt of the personal access code (and further programming information), microprocessor 56 may generate various tones at its output PB1 (using conventional timer based tone generating routines) so that the line does not sound "dead" to the user. Different tones may be generated in response to successful input of codes to provide user feedback and a positive acknowledgement of correct programming.

If a valid personal access code is not keyed in within a certain software controlled time-out period (or if "off hook" detector determines the subscriber phone 64 is back "on hook") microprocessor 56 de-energizes relay RLY1 and returns to decision block 104 to await additional inputs (decision block 110). If, however, the personal access code is keyed in (the "yes" exit of decision block 108), microprocessor 56 expects the user to next key in a single digit "option select" number specifying the feature to be programmed. The following option select numbers are available in the preferred embodiment:

1—Program Caller Screen Codes
2—Program Number of Rings Before Answer
3—Program Personal Access Code
4—Program Dial Screen Numbers
5—Program System On/Off
6—Program Call Screen On/Off
7—Program Dial Screen On/Off
8—Program All Codes
9—(reserved)
0—(reserved)
—(reserved)
*—(reserved)

Microprocessor 56 executes decision block 112-118 to test which of the option select numbers is inputted. If no option select number is inputted within a certain time-out period (or the subscriber phone 64 is placed back "on hook"), microprocessor 56 terminates the programming routine and returns to block 104 to await additional inputs.

Figure 3:
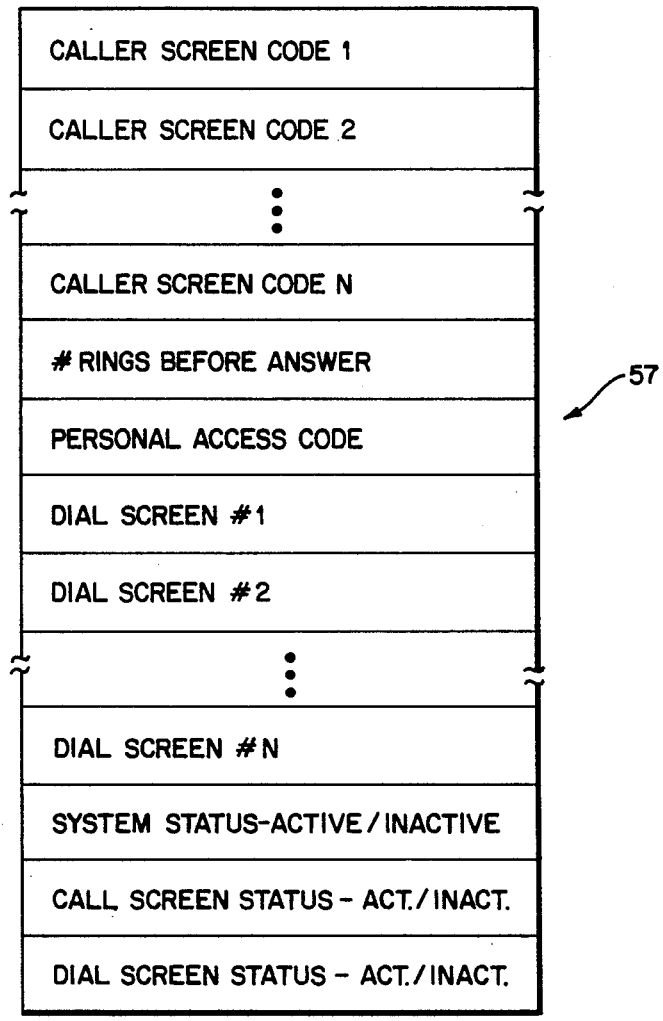
FIG. 3 is a schematic block diagram of a non-volatile programmed database maintained by the microprocessor shown in FIG. 1.

If the user keys in an option select number of "3" (the "yes" exit from decision block 112), microprocessor 56 awaits receipt of a new three-digit personal access code in the preferred embodiment, and overwrites this new code over the previous contents of the personal access code field shown in FIG. 3. If desired, the user may be required to key in the same new personal access code twice in succession before the old personal access code is overwritten to ensure that the user "knows" the new personal access code. Some emergency means of causing microprocessor 56 to restore a predetermined, manufacturer-specified personal access code into the personal access code field is preferably provided (e.g., depressing a programming reset button mounted on the housing in which system 10 is stored or by disconnecting a battery backing up memory 57) so there is some way of regaining control of the system in the event the user forgets the personal access code he has programmed.

If the user inputs option select number "1" (new caller screen code, as tested for by decision block 114), the microprocessor 56 prepares itself for overwriting the previous caller screen codes 1-N with new values. These caller screen codes are each two digits long in the preferred embodiment, and are used during call screening as "passwords". That is, a caller must enter one of the N preprogrammed multi-digit caller screen numbers in order to control system to ring subscriber phone 64 when call screening is active, and the particular one of the N caller screen numbers the caller dials may control which of N preprogrammed ring cadences microprocessor 56 rings the subscriber phone with. Different caller screen numbers may thus be given to different people or groups of people, and the user can further screen calls manually based on the ring cadence (or invalidate some people's access code while preserving other existing access codes). In the preferred embodiment, microprocessor 56 reprograms all of caller screen numbers 1-N at the same time, and thus requires the user to key in a sequence of N multi-digit caller screen numbers. These N numbers are stored in caller screen code fields 1-N shown in FIG. 3 (block 115).

If the user inputs an option select number "2" (program number of rings before answer, tested for by decision block 116), the user is expected to input a single digit having a value of 1-9 in the preferred embodiment to specify the number of telephone company rings microprocessor 56 should count on the incoming telephone line before automatically answering the line. This inputted parameter value is stored in the "# rings before answer" field shown in FIG. 3 by block 117.

If the user inputs an option select parameter field of "4" (program dial screen numbers, tested for by decision block 118), the user is expected by microprocessor 56 to input 1-N three-digit call prefix codes. These dial screen codes are used during outgoing call screening to restrict certain outgoing call prefixes from being dialed. For example, the user might program the telephone company international call access code "011" as one of the dial screen codes to prevent international calls from being placed, and program certain "900" number prefixes to prevent "party line" and other charge type calls from being made. If desired "wild card" type characters (e.g., "*") may be accepted to permit unauthorized prefixes to be specified in terms of their first one or two digits (e.g., all long distance calls beginning with the number "1"). Block 119 stores—1-N dial screen codes into dial screen # fields 1-N shown in FIG. 3.

One of the option select numbers ("8") requires the user to input all four types of information in sequence (e.g., separated by a suitable separation code such as "*" or "#" or by a suitable time delay). This option select number is used, for example, when first programming system 10 as a convenience so that the user need not key in each individual option select number 1-4 in sequence, and causes all four "store" blocks 113, 115, 117, 119 to be executed in sequence.

If the user enters an option select code of "5", "6" or "7" (as tested for by decision block 120), the status of system 10 is to be changed. These status select codes have no parameters associated with them in the preferred embodiment, and simply toggle the specified function between active and inactive states. If, for example, the user inputs the option select code "5" (after, of course, pressing the "#" key), the value stored in the system status flag shown in FIG. 3 is negated. Thus, if system 10 was formerly active, the system becomes inactive and performs no functions except programming functions (and relay RLY3 is de-energized to directly connect the telephone line to subscriber set 64). Similarly, inputting the option select code "6" negates the call screen status flag value (e.g., activating incoming call screening if it was previously inactive). Inputting the option select code "7" negates the value stored in the dial screen status flag (to deactivate outgoing dial screening if it was previously activated or vice versa).

If decision block 104 detects a leading inputted number other than "#" in the preferred embodiment, the user is either originating an outgoing call or activating a function (hold, call transfer, intercom or dial screen override). If dial screening is active (tested for by decision block 124, which checks the value of the dial screen status flag), microprocessor 56 monitors the first three digits keyed in by the user and compares them with each of preprogrammed dial screen codes 1-N stored in memory 57. If the first three digits inputted by the user matches any one of the preprogrammed "restricted" prefixes (as tested for by decision block 126), the user is attempting to make an unauthorized call and microprocessor 56 "hangs up" to inhibit the call by de-energizing relay RLY1 (block 128). If the inputted prefix is not an unauthorized one, the call is allowed to proceed.

Whether or not call screening is active, during all calls (incoming or outgoing) microprocessor 56 continually monitors tones present at the secondary winding of transformer TFM1 to permit the user to activate various functions in the preferred embodiment. The functions are specified by the following digits inputted after the "*" key in the preferred embodiment:

1—Hold
2—Transfer
3—Intercom
4—Dial Screen Override
5-9,0,#,*—Port C accessory control block For example, suppose dial screening is active and the user depresses the "*" key followed by the "4" key to override dial screening for a single call. Decision block 130 detects the "*" DTMF tone pair and causes the microprocessor 56 to decode the next occurring tone pair (decision blocks 132-138). If the next occurring tone corresponds to a "4", microprocessor 56 waits for the user to successfully input the personal access code (block 140). If the personal access code is inputted correctly, microprocessor 56 disables blocks 126, 128 until subscriber phone 64 is next placed "on hook" (thus allowing users who know the personal access code to make a normally restricted call without requiring disablement of dial screening).

If the user inputs a "*" followed by a "1" (tested for by decision block 132), the telephone line is placed on "hold" by energizing relay RLY1 (if not already energized) and de-energizing relay RLY2 (block 142)—connecting the telephone line across the low impedance of the transformer TFM1 primary winding and resistor R40 and disconnecting the subscriber phone 64 from the telephone line. The user may then hang up subscriber phone 64 and subsequently pick up the same or different phone without disconnecting the calling party. If "hold" is activated and the microprocessor 56 detects a subscriber phone "on hook" followed by an "off hook", microprocessor 56 re-energizes relay RLY2 to reconnect the subscriber phone 64 to the telephone line.

If the user inputs a "*" followed by a "2" (detected by decision block 134), the simulated call transfer function is activated. This call transfer function is similar to the hold function except that microprocessor 56 controls ringer oscillator/amplifier 60 to generate a ringing voltage after de-energizing relay RLY2 and detecting that the subscriber phone 64 has been placed "on hook" (block 144). At the same time, ringback tone generator 62 generates a ringback tone so the caller hears tones notifying him that the subscriber phone 64 is ringing and awaiting answer. Once the handset of subscriber phone 64 is again lifted to produce the off hook state, microprocessor 56 energizes relay RLY2 (to reconnect the subscriber phone to the telephone line) and controls the ringer oscillator/amplifier to cease producing ringing voltage. This call transfer function permits the subscriber to answer an incoming call, put the call on hold, and cause all subscriber phones 64 to ring (thus requesting someone else to answer the call).

If the user depresses the "*" key followed by a "3" (as tested for by decision block 136), the user has requested the intercom function. The intercom function is preferably disabled in the preferred embodiment whenever an incoming call is being received, and is thus generally used for permitting internal communication between different subscriber units 64. When the "3" DTMF tone pair is received (after a "*") by microprocessor 56 via decoder 54 and transformer TFM1, relays RLY1 and RLY2 are both de-energized to disconnect the telephone line from the subscriber phones and to connect the subscriber phones 64 to RC network R50, C18 and to the −48 VDC power source (relay RLY3 remains energized) (block 146). Microprocessor 56 then waits for the subscriber phone 64 to go back "on hook", and then causes ringer oscillator/amplifier 60 to generate ringing voltage (preferably using a distinctive ringing cadence that signifies intercom). Ringing continues until a subscriber unit 64 goes "off hook" (note that the person initiating the intercom call should "hang up" and wait until he hears the ringing stop before he picks up the handset again). When this further "off hook" condition is detected, system 10 takes no further action (permitting conversation to occur between extensions of subscriber phone 64) until an "on hook" condition is again detected. If an incoming ring is detected by the ring detector while the intercom function is active, then a tone is generated by the microprocessor 54 to signal that an incoming call is present. The user can then choose to either answer the phone by placing the phone on-hook then off-hook or by allowing system 10 to screen the call. When an "on hook" is again detected, microprocessor 56 returns relays RLY1–RLY3 to their initial states to permit incoming calls to once again be received.

Figure 2B:
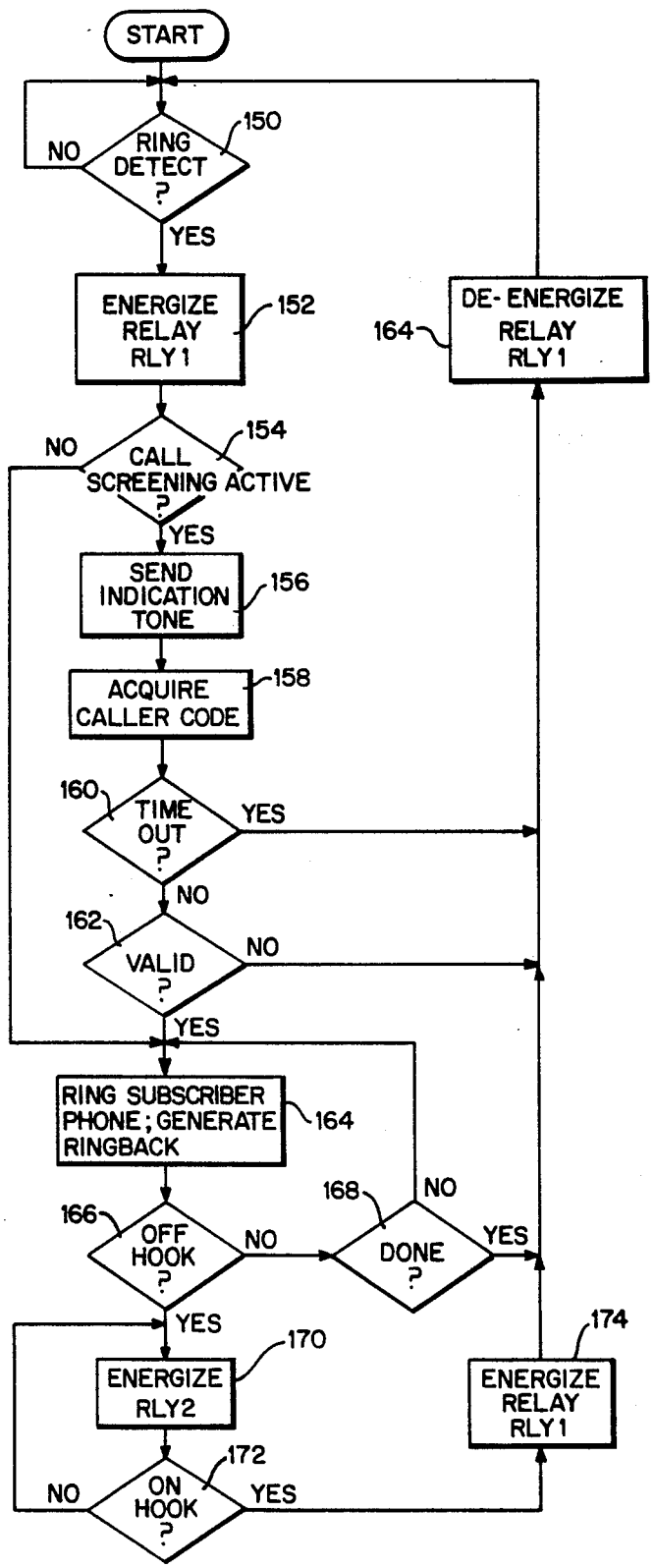

Referring now to FIG. 2B (a flowchart of exemplary program control steps performed by microprocessor 56 to handle incoming calls), the "normal" state of relays RLY1–RLY3 when system 10 is active, powered on, and awaiting a call is as follows:
RLY1—De-energized
RLY2—De-energized
RLY3—Energized.
Thus, subscriber phone 64 is normally disconnected from the telephone line in the preferred embodiment (whether or not call screening is active).

Microprocessor 56 continually monitors the output of ring detector 50 for an incoming call (block 150, FIG. 2B). When an incoming call is received and the number of rings specified by the preprogrammed "# rings before answer" field of FIG. 3 have occurred (the "yes" exit of decision block 150), microprocessor 56 energizes relay RLY1 to place the telephone line "off hook" (block 152) and then determines whether call screening is active (decision block 154 simply tests the value of the call screen status flag shown in FIG. 3). If call screening is active, microprocessor 56 requires the caller to input, via his own Touch Tone keypad, a multi-digit access code previously programmed into memory 57 before the microprocessor will energize relay RLY2 to connect the incoming telephone call to the subscriber phone 64.

For call screening, microprocessor 56 generates an indication tone at its PB1 output (block 156) and applies this indication tone to the telephone line via transformer TFM1 (across which the telephone line is already connected because of the closure of relay RLY1). Microprocessor 56 then waits for the caller to input a multi-digit access code (block 158). If more than a certain timeout period (e.g., 10 or 15 seconds) elapses without a valid code being acquired or if an invalid code is inputted (decision blocks 160, 162), microprocessor 56 "hangs up" on the caller by de-energizing relay RLY1 (block 164). If, on the other hand, a match exists between the multi-digit code inputted by the caller and one of the N caller screen codes previously stored into memory 57 (see FIG. 3) (as tested for by decision block 162)—or if call screening is not active—microprocessor 56 causes the subscriber phone 64 to ring by energizing the ringer oscillator/amplifier 60 (block 164). At the same time, ringback tone generator 62 applies ringback signals to the telephone line to notify the caller that the subscriber phone 64 is ringing. If call screening is active, microprocessor 56 can control the cadence of the ringing in response to which caller screen code was inputted to permit the subscriber to differentiate between different calling parties by the sound of the ring.

It is possible to add an additional relay (not shown in FIGURES 1A and 1B) for each of plural phones 64 which can be controlled on an individual basis by microprocessor 56 depending upon which of plural valid caller screen codes is inputted by the caller. For example, one caller screen code might connect only a phone 64 in a child's room, while another valid call screen code might cause processor 56 to connect only a phone in a parent's room. The feature can also be used to individually address phones when the system operates in the intercom mode. To provide such additional phone selection features, additional output ports of processor 56 can be connected to further relay drivers and associated relays connected between terminals T', R' and individual phones 64 (with an external processor address decoder used if additional port outputs are not available).

If the subscriber phone 64 does not go "off hook" after a certain time period (in the case of active call screening) or the caller hangs up (as detected in the preferred embodiment by the cessation of ringing detected by ring detector 50), microprocessor 56 de-energizes relay RLY1 to "hang up" the telephone line (decision blocks 166, 168, block 164). On the other hand, if the subscriber phone 64 goes "off hook" (tested for by decision block 166), microprocessor 56 energizes relay RLY2 (block 170) to connect the telephone line to the subscriber phone. System 10 then waits until the subscriber phone goes "on hook" again (tested for by decision block 172), at which time microprocessor 56 de-energizes relays RLY2 (block 174) and RLY1 (block 164) and waits for another call. During the time decision block 172 tests for "on hook", decision blocks 130, 132, 134 and associated action blocks 142, 144 are fully active to permit the subscriber to activate the "hold" and "call transfer" functions at will.

In the preferred embodiment, port C is used as an accessory device driver that can control other devices (e.g., coffee maker, lights, alarms, etc.), using "*"+"5x", "6x", "7x", etc. Such additional control functions may be performed by additional relays and associated drivers connected to output ports of processor 56 in response to user programmable additional control function key sequences to permit users to, for example, turn on and off outside flood lights from their bedside telephone, or the like.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What I claim is:

1. A telephone interface circuit for interfacing a telephone line with at least one residential type standard telephone set, comprising:
   switching means for normally disconnecting said telephone line from said telephone set;
   sensing means connected to said telephone line for sensing ringing voltage on said telephone line and for producing a first signal when said ringing voltage is sensed;
   coupling means for coupling audio signals to and from said telephone line and to and from said telephone set, said coupling means including means for presenting a low DC resistance to said telephone line when connected thereto;
   said switching means including a first switch means connected between said telephone line and said low resistance presenting means for connecting said telephone line to said low resistance presenting means in response to said first signal;
   ring signal generating means operatively coupled to said telephone set for selectively causing said telephone set to ring, said ring signal generating means including means for controlling the cadence of said telephone set ringing;
   tone decoding means connected to said transformer means for and connected to receive DTMF tone sequences from said telephone line and for decoding said received tone sequences;
   memory means for storing information representing plural decoded tone sequences corresponding to respective different callers and for also storing information representing plural different ring cadences respectively associated with said plural tone sequences;
   processor means coupled to said ring signal generating means, said tone decoding means and said memory means, for testing whether information corresponding to a decoded received tone sequence corresponds to information stored in said memory means and if said testing step reveals such correspondence, for generating a second signal and controlling said ring signal generating means to cause said telephone set to ring with a cadence represented by information stored in said memory means associated with said decoded received tone sequence, said cadence thus corresponding to a particular caller;
   said switching means further including a second switch connected between said telephone line and said telephone set for connecting said telephone line to said telephone set in response to said second signal.

2. A circuit as in claim 1 wherein said sensing means includes counting means for counting the number of rings represented by said ringing voltage and for producing said first signal only after a certain number of rings have occurred.

3. A circuit as in claim 2 further including programming means connected to said counting means for programming said number rings.

4. A circuit as in claim 3 wherein said programming means includes means connected to said telephone set for acquiring said programmed number of rings in response to keys depressed on said telephone set.

5. A circuit as in claim 1 further including means connected to said telephone set for providing power to said telephone set independently of the state of said switching means.

6. A circuit as in claim 1 further including means connected to said switching means and responsive to power applied to said circuit for directly connecting said telephone line to said telephone set whenever said power is disconnected.

7. A circuit as in claim 1 wherein:
   said tone decoding means is also for decoding sequences of DTMF tone pairs produced by said telephone set, for comparing said decoded tone pair sequences with at least one preset sequence, and for providing a further signal whenever a decoded sequence matches said preset sequence; and
   said second switch means disconnects said telephone line from said telephone set in response to said further signal.

8. A circuit as in claim 7 further includes means connected to said telephone set and to said tone decoding means for acquiring said preset sequence in response to the depression of keys of said telephone set.

9. A circuit as in claim 7 wherein said tone decoding means further includes override means for inhibiting production of said further signal in response to a personal access tone sequence produced by said telephone set.

10. A circuit as in claim 1 further including:
    ringing voltage generating means connected to said telephone set for applying a ringing voltage to said telephone set in response to said second signal; and
    off hook detecting means connected to said telephone set for inhibiting application of said ringing voltage by said ringing voltage generating means in response to a change in DC resistance of said telephone set.

11. A circuit as in claim 10 wherein said off hook detecting means includes an optoisolator.

12. A telephone interface circuit for interfacing a telephone line with at least one residential type standard Touch Tone telephone set, comprising:

RLY3 relay means for normally disconnecting said telephone line from said telephone set and for alternately connecting said line to said set;

ring detector means connected to said telephone line for sensing ringing voltage on said telephone line and for producing a first signal when said ringing voltage is sensed;

RLY1 relay means for alternately connecting and disconnecting said telephone line to a transformer means;

said transformer means for coupling audio signals to and from said telephone line and to and from said telephone set, said transformer means including means for presenting a low DC resistance to said telephone line when connected thereto;

tone decoding means connected to said transformer means for producing a second signal in response to receipt over said telephone line of a plurality of predetermined DTMF tone pairs;

ringing voltage generating means connected to said telephone set for providing a ringing voltage to said telephone set in response to said second signal and for ceasing to produce said ringing voltage in response to a third signal;

off hook detector means connected to said telephone set for producing said third signal in response to detection of a change of DC resistance of said telephone set; and RLY2 relay means connected between said telephone line and said telephone set for connecting said telephone line to said telephone set in response to said third signal.

13. A circuit as in claim 12 further including ringback generator means connected to receive said second and third signals and also connected to said transformer means for providing a ringback signal to said telephone line upon receipt of said second signal and for ceasing to provide said ringback signal upon receipt of said third signal.

14. A circuit as in claim 13 wherein said ringback generator means includes:

a first operational amplifier stage connected in a wein bridge oscillator configuration to provide AC signals at a first frequency;

a second operational amplifier stage connected in a wein oscillator configuration to provide AC signals at a second frequency different from said first frequency; and means connected to said first and second frequency AC signals for providing both of said AC signals to said telephone line.

15. A signal as in claim 12 wherein said ringing voltage generating means includes:

a first operational amplifier state connected in a wein bridge oscillator configuration to produce AC signals at a first frequency; and push-pull bipolar power amplifier means connected to said AC signals for amplifying said signals an applying said amplified signals to said telephone set.

16. A circuit as in claim 12 wherein said ring detector means and said off hook detector means each comprises an opto-isolator.

17. A circuit as in claim 12 wherein said ring detector means includes delay means for lengthening the time and first signal is produced relative to the duration of pulses of said ringing voltage.

18. A telephone interface circuit for interfacing a telephone line with at least one residential type standard Touch Tone telephone set, comprising:

ring detector means connected to said telephone line for sensing ringing voltage on said telephone line and for producing a first control signal when said ringing voltage is sensed:

tone decoding means connected to said telephone line and to said telephone set for decoding DTMF tone pairs received thereby;

switching network means connected between said telephone line and said telephone set for controllably (i) connecting said telephone set to said telephone line, (ii) connecting said telephone line to a low DC resistance, and (c) disconnecting said telephone line from both said low DC resistance and said telephone set; and digital signal processing means connected to each of said aforementioned means for performing the following functions:

(a) controlling said switching network means to connect said telephone line to said low DC resistance in response to detection of ringing voltage by said ring detector means, (b) controlling said switching network means to connect said telephone set to said telephone line in response to decoding by said tone decoding means of a sequence of tone pairs matching a preset sequence of tone pairs, (c) disabling said controlling function (b) in response to decoding by said tone decoding means of at least one tone pair generated by said telephone set, and (d) storing representations of said preset sequence of tone pairs in response to production of said tone pairs by said telephone set;

wherein:

said circuit further comprises off hook detecting means connected to said telephone set for detecting whenever said telephone set is off hook, and ringing voltage generating means connected to said telephone set for controllably providing a ringing voltage to said telephone set; and said processing means is connected to said ringing voltage generating means and said off hook detecting means, and performs the following additional functions:

(e) controlling said ringing voltage generating means to provide a ringing voltage to said telephone set in response to decoding of said matching tone pair sequence, and (f) controlling said ringing voltage generating means to cease providing said ringing voltage in response to detection by said off hook detecting means of said detected off hook;

wherein said processing means includes:

means for storing plural of said preset tone pair sequences, said plural tone pair sequences being associated with corresponding plural different outside callers, means for comparing said decoded tone pair sequence with each of said plural stored sequences, and if said comparing means reveals a match between said decoded sequence and one of said stored sequences, controlling said ringing voltage generating means to generate said ringing voltage in a cadence uniquely corresponding to said matching, stored sequence and different from cadences associated with others of said plural stored sequences.

19. A telephone interface circuit for interfacing a telephone line with at least one residential type standard Touch Tone telephone set, comprising:
ring detector means connected to said telephone line for sensing ringing voltage on said telephone line and for producing a first control signal when said ringing voltage is sensed:
tone decoding means connected to said telephone line and to said telephone set for decoding DTMF tone pairs received thereby;
switching network means connected between said telephone line and said telephone set for controllably (i) connecting said telephone set to said telephone line, (ii) connecting said telephone line to a low DC resistance, and (c) disconnecting said telephone line from both said low DC resistance and said telephone set; and
digital signal processing means connected to each of said aforementioned means for performing the following functions:
(a) controlling said switching network means to connect said telephone line to said low DC resistance in response to detection of ringing voltage by said ring detector means,
(b) controlling said switching network means to connect said telephone set to said telephone line in response to decoding by said tone decoding means of a sequence of tone pairs matching a preset sequence of tone pairs,
(c) disabling said controlling function (b) in response to decoding by said tone decoding means of at least one tone pair generated by said telephone set, and
(d) storing representations of said preset sequence of tone pairs in response to production of said tone pairs by said telephone set;
wherein said processing means performs the further function of disabling one or more of said aforementioned functions in response to decoding by said tone decoding means of preset control codes generated by said telephone set, and
wherein said preset control codes include a prespecified user access code and a further option select code.

20. A telephone interface circuit for interfacing a telephone line with at least one residential type standard tone type telephone set, comprising:
switching means for normally disconnecting said telephone line from said telephone set;
sensing means connected to said telephone line for sensing ringing voltage on said telephone line and for producing a first signal when said ringing voltage is sensed;
transformer means for coupling audio signals to and from said telephone line and to and from said telephone set, said transformer means including means for presenting a low DC resistance to said telephone line when connected thereto;
said switching means including a first switch means connected between said telephone line and said transformer low resistance presenting means for connecting said telephone line to said low resistance presenting means in response to said first signal;
tone decoding means connected to said transformer means for decoding tone signals;
said switching means further including a second switch connected between said telephone line and said telephone set for connecting said telephone line to said telephone set in response to said second signal;
failure detecting means for detecting a failure condition in said telephone interface circuit; and
a further relay RLY3 coupled to said switching means which operates to connect said telephone line directly to said telephone set in response to detection of either of: (a) said failure condition, and (b) a predetermined tone signal decoded by said tone decoding means.

21. A telephone interface circuit for interfacing a telephone line with at least one residential type standard tone type telephone set, comprising:
switching means for normally disconnecting said telephone line from said telephone set;
sensing means connected to said telephone line for sensing ringing voltage on said telephone line and for producing a first signal when said ringing voltage is sensed;
transformer means for coupling audio signals to and from said telephone line and to and from said telephone set, said transformer means including means for presenting a low DC resistance to said telephone line when connected thereto;
said switching means including a first switch means connected between said telephone line and said transformer low resistance presenting means for connecting said telephone line to said low resistance presenting means in response to said first signal;
tone decoding means connected to said transformer means for decoding tone signals;
said switching means further including a second switch connected between said telephone line and said telephone set for connecting said telephone line to said telephone set in response to a second signal;
programmable processor means, operatively coupled to said switching means and said tone decoding means, for controlling said switching means in response to comparison between tones decoded by said tone decoding means and programmed tone signals, said processor means including means operable in a programming mode for storing said programmed tone signals in response to tone signals generated by said telephone set; and
busy means connected to said telephone line and to said processor means for placing said telephone line in a busy state during operation of said processor means in said programming mode.

22. A circuit as in claim 21 wherein said programmable processor means includes means for inhibiting said programming mode unless said programming tones are preceded by predetermined password tones also generated by said telephone set.

23. A circuit as in claim 22 wherein said programmable processor means includes means for storing password representing information representing said password tones and means for altering said password representing information in response to further password tones also generated by said telephone set.

24. A telephone interface circuit for interfacing a telephone line with at least one residential type standard tone type telephone set, comprising:

switching means for normally disconnecting said telephone line from said telephone set;

sensing means connected to said telephone line for sensing ringing voltage on said telephone line and for producing a first signal when said ringing voltage is sensed;

transformer means for coupling audio signals to and from said telephone line and to and from said telephone set, said transformer means including means for presenting a low DC resistance to said telephone line when connected thereto;

said switching means including a first switch means connected between said telephone line and said transformer low resistance presenting means for connecting said telephone line to said low resistance presenting means in response to said first signal;

tone decoding means connected to said transformer means for decoding tone signals;

said switching means further including a second switch connected between said telephone line and said telephone set for connecting said telephone line to said telephone set in response to said second signal;

ring signal generating means coupled to said telephone set for applying a ring signal to said telephone set; and programmable means, operatively coupled to said ring signal generating means and to said telephone set, for storing programmed values relating to plural programmed features, said programming means including means responsive to tones decoded by said tone decoding means for permitting a user to alter programmed values corresponding to all of said plural programmed features in sequence through generation of tones by said telephone set.

25. A telephone interface circuit for interfacing a telephone line with at least one residential type standard tone type telephone set, comprising:

switching means for normally disconnecting said telephone line from said telephone set;

sensing means connected to said telephone line for sensing ringing voltage on said telephone line and for producing a first signal when said ringing voltage is sensed;

transformer means for coupling audio signals to and from said telephone line and to and from said telephone set, said transformer means including means for presenting a low DC resistance to said telephone line when connected thereto;

said switching means including a first switch means connected between said telephone line and said transformer low resistance presenting means for connecting said telephone line to said low resistance presenting means in response to said first signal;

tone decoding means connected to said transformer means for decoding tone signals generated by said telephone set;

programmable store means for storing programmed values respresenting outgoing tone dialing sequences generated by said telephone set, said programmable store means including programming means for storing a wildcard tone dialing sequence corresponding to a plurality of outgoing tone dialing sequences in response to tone signals generated by said telephone set; and processing means, coupled to said programmable store means, said switching means and said tone decoding means, for inhibiting connection between said telephone line and said telephone set whenever an outgoing tone sequence generated by said telephone set and decoded by said tone decoding means matches one of the plurality of outgoing tone dialing sequences corresponding to said stored wildcard tone dialing sequence.

* * * * *